(12) United States Patent
Cox

(10) Patent No.: US 11,466,795 B2
(45) Date of Patent: Oct. 11, 2022

(54) FASTENER

(71) Applicant: David Cox, Waterloo, IA (US)

(72) Inventor: David Cox, Waterloo, IA (US)

(73) Assignee: Wolverine Straps, LLC, Waterloo, IA (US)

(*) Notice: Subject to any disclaimer, the term of this patent is extended or adjusted under 35 U.S.C. 154(b) by 0 days.

(21) Appl. No.: 17/248,790

(22) Filed: Feb. 8, 2021

(65) Prior Publication Data

US 2021/0222798 A1    Jul. 22, 2021

Related U.S. Application Data

(63) Continuation-in-part of application No. 29/652,494, filed on Sep. 3, 2020, now Pat. No. Des. 948,329, which is a continuation-in-part of application No. 16/749,789, filed on Jan. 22, 2020, now abandoned.

(51) Int. Cl.
*F16L 3/04* (2006.01)
*F16B 15/00* (2006.01)

(52) U.S. Cl.
CPC ........... *F16L 3/04* (2013.01); *F16B 15/0015* (2013.01)

(58) Field of Classification Search
CPC ..................................... F16L 3/04; F16L 3/14
See application file for complete search history.

(56) References Cited

U.S. PATENT DOCUMENTS

| | | | |
|---|---|---|---|
| 642,236 A * | 1/1900 | Larimer | A47C 21/022 24/3.12 |
| 661,604 A | 11/1900 | Grabler | |
| 1,175,802 A | 3/1916 | Orcutt | |
| 1,329,268 A * | 1/1920 | Dickelmann | F16L 3/04 248/231.91 |
| 1,529,881 A | 3/1925 | Engle | |
| 1,981,973 A | 11/1934 | Tinnerman | |
| 2,100,001 A * | 11/1937 | Eberle | F16L 3/04 248/74.5 |
| 2,185,082 A | 12/1939 | Hooks | |
| 2,197,750 A | 4/1940 | Lagaard | |
| 2,230,734 A | 2/1941 | Antwerp | |
| 2,282,631 A | 5/1942 | Winship | |
| 2,310,434 A | 2/1943 | Hyman | |

(Continued)

FOREIGN PATENT DOCUMENTS

| | | | |
|---|---|---|---|
| CH | 150427 A | * | 10/1931 |
| DE | 514513 C | * | 12/1930 |
| KR | 301135188 | | 11/2021 |

OTHER PUBLICATIONS

"Half Pipe Clamps", Mainline, Product Specifications, 1 page, revised Sep. 21, 2017.

(Continued)

*Primary Examiner* — Kimberly T Wood
(74) *Attorney, Agent, or Firm* — McKee, Voorhees & Sease, PLC

(57) ABSTRACT

A fastener for fastening pipes or electrical conduit can be installed with the optional use of nails or screws. The fastener includes sharp teeth or spikes which can be hammered into an external surface, such as wood or masonry. The teeth or spikes are positioned, oriented, and otherwise configured to best suit the intended application. Installation can be accomplished using only the fastener itself and force exceeding a minimal threshold.

14 Claims, 7 Drawing Sheets

(56) References Cited

U.S. PATENT DOCUMENTS

| | | | |
|---|---|---|---|
| 2,317,825 A | 4/1943 | Teas, Sr. | |
| 2,681,196 A | 6/1954 | Lind | |
| 2,689,702 A | 9/1954 | Healey, Jr. | |
| 2,885,168 A | 5/1959 | Silverman | |
| 3,016,220 A * | 1/1962 | Rose | F16L 3/13 |
| | | | D25/68 |
| 3,075,037 A | 1/1963 | Schlein | |
| 3,099,054 A * | 7/1963 | Spiro | F16L 3/1236 |
| | | | 248/74.3 |
| 3,185,420 A | 5/1965 | Stewart | |
| 3,220,679 A | 11/1965 | Larson | |
| 3,298,651 A | 1/1967 | Passer | |
| 3,583,663 A | 6/1971 | Snow, Jr. | |
| D264,494 S | 5/1982 | Chapa | |
| 4,454,636 A | 6/1984 | Pearson | |
| 4,935,998 A | 6/1990 | Frazier et al. | |
| 7,225,590 B1 | 6/2007 | diGirolamo et al. | |
| 7,523,897 B2 | 4/2009 | Boltz et al. | |
| D754,306 S | 4/2016 | Yesavage et al. | |
| D754,307 S | 4/2016 | Dole et al. | |
| D755,621 S | 5/2016 | Madara et al. | |
| D756,212 S | 5/2016 | Wilk, Jr. et al. | |
| 9,772,049 B2 | 9/2017 | Billimack | |
| 10,501,189 B2 | 12/2019 | Malligere et al. | |
| 2005/0230578 A1 | 10/2005 | Stockton | |
| 2010/0260573 A1 | 10/2010 | Gardner et al. | |
| 2011/0209912 A1 | 9/2011 | Korcz et al. | |
| 2015/0048220 A1 | 2/2015 | Patterson | |
| 2019/0118062 A1* | 4/2019 | Lay | A63B 5/11 |
| 2021/0222798 A1 | 7/2021 | Cox | |

OTHER PUBLICATIONS

"Rigid/intermediate grade conduit fittings", www.crouse-hinds.com. Commercial Products Catalog, pp. 27-28, 2019.

Zoro, "Axle Clamp", www.google.com/zoro.com., Available from internet URL: https://www.zoro.com/dayton-axle-clamp-mhaxc001g/i/G2730336/?q=Axle%20Clamp, 5 pages, site visited Dec. 16, 2021.

* cited by examiner

FASTENER

CROSS REFERENCE TO RELATED APPLICATIONS

This is a continuation-in-part patent application which claims priority under 35 U.S.C. § 120 to U.S. Ser. No. 29/652,494, filed Sep. 3, 2020, which is a continuation-in-part of Ser. No. 16/749,789, filed Jan. 22, 2020, now abandoned. These applications are herein incorporated by reference in their entireties, including without limitation, the specification, claims, and abstract, as well as any figures, tables, appendices, or drawings thereof.

FIELD OF THE INVENTION

The present invention relates generally to a household hardware component. More particularly, and without limitation, the present invention relates generally to a fastener for securing pipes, electrical conduit, and the like.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Clamps and straps for securing pipes and/or other electrical conduit known in the art require the use of screws, nails, and/or other small, separate fastening components. These small, separate fastening components are easily lost and are not always universal. Different types of screws can require an electrician or plumber to carry with them different types of screwdrivers to each job site for installation. Drills may also need to be used to create holes for screws and/or nails, requiring the electrician to further carry drill bits of varying sizes and shapes.

Half pipe clamps, 2-hole straps, and the like exemplify devices which suffer from the deficiencies noted above. Installing these types of fasteners can be incredibly difficult for the electrician or plumber, especially when installing overhead.

Thus, there exists a need in the art for a device which better secures pipes and/or electrical conduit.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

Use of the present invention allows installation without requiring screws, thereby minimizing the number of components and/or tools required to secure pipes (e.g. stainless steel or PVC pipes) and/or electrical conduit for power distribution. For example, the fastener can be installed onto wood and/or other masonry solely through the use of a blunt object, such as a hammer.

It is preferred the fastener be safe, cost effective, and durable. For example, the fastener can be adapted to resist thermal transfer and/or electric conductivity.

The apparatus described herein can be used in a wide variety of applications. For example, The fastener can be used where necessary to fasten or secure CTS tubing and IPS piping in residential or commercial applications. The fastener can be mounted to wood, metal studs, or joists using nails or screws in holes on one or more sides of the fastener. At least one embodiment disclosed herein comprises a distinct aesthetic appearance. Ornamental aspects included in such an embodiment can help capture a consumer's attention and/or identify a source of origin of a product being sold. Said ornamental aspects should not impede functionality of the present invention.

Methods can be practiced which facilitate use, manufacture, assembly, maintenance, and repair of a fastener accomplishing some or all of the previously stated objectives. Moreover, the fastener can be incorporated into systems or kits which accomplish some or all of the previously stated objectives.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

Figure 1:
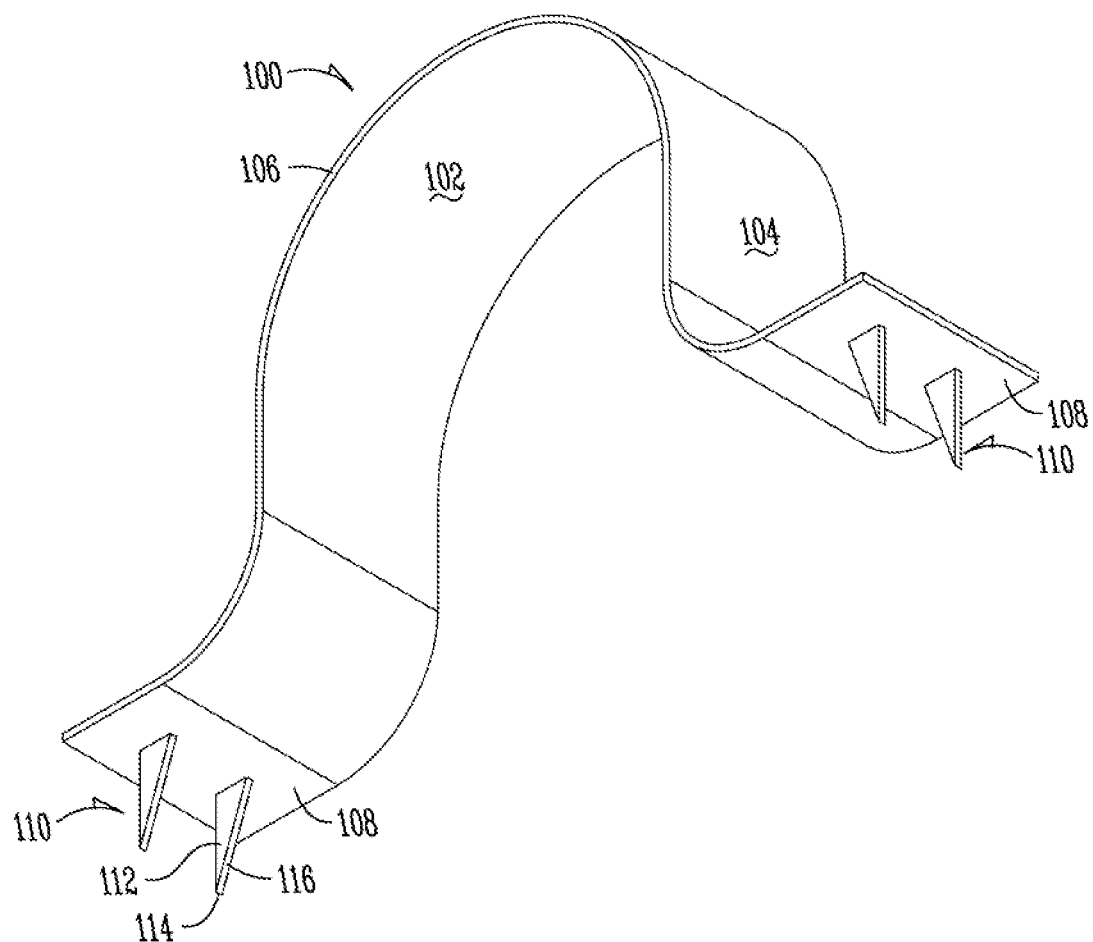
FIG. 1 shows a perspective view of a fastener.

An artisan of ordinary skill need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

The fasteners 100 shown in FIGS. 1-7 facilitate securement of objects in stable and reinforced positions. For example, in the home, the fasteners 100 can be used to secure pipes, tubes, ducts, cables, electrical conduit, supply lines, and the like to external support structures, such as the foundation, walls, ceilings, etc.

The fastener body generally includes a lower surface 102, an upper surface 104, and a perimeter 106. The lower surface 102 and the upper surface 104 may be substantially parallel to one another and offset by a thickness of the perimeter 106. The lower and upper surfaces 102, 104 traverse the fastener 100 from one end to the other, for example along perimeter 106. The lower and upper surfaces 102, 104 have a width which, with respect to FIGS. 2-3, extends into the page. The size and/or shape of the perimeter 106 can be selected or adjusted based on a size or shape of the object to which the fastener 100 is to be secured. The perimeter 106 preferably forms an arc or hook-like portion that matches a curvature of an upper surface of the object to be secured. The arc or hook-like portion can be of an arcuate extent that is slightly less, equal to, or slightly more than 180 degrees, depending on the particular embodiment and end use application. As the perimeter 106 nears either end of the fastener 100, there can exist points of inflection along the same which transition the perimeter 106 from convex to concave and vice versa. In the embodiment shown in FIGS. 1-2 for example, the perimeter 106 is initially concave near a plate 108 at the first end before transitioning to convex near horizontal axis 126. The perimeter 106 remains convex until reaching the horizontal axis 126 again opposite the first point of inflection. Towards a plate 108 at the second end, the perimeter 106 is again concave.

In at least one alternative embodiment, the fastener body comprises a block wherein the upper surface 104 is flat and the lower surface 102 forms a cavity through which an external object can be secured. To determine whether use of said alternative embodiment is preferable to, for example, that which is shown in FIG. 1, the benefit of being able to more easily support the flat upper surface 104 with other flat surfaces must be weighed against the increased weight of the object and/or cost of manufacturing the same. Where objects are to be secured near corners or other flat surfaces, use of a block-type fastener body 102 may be particularly beneficial.

Figure 2:
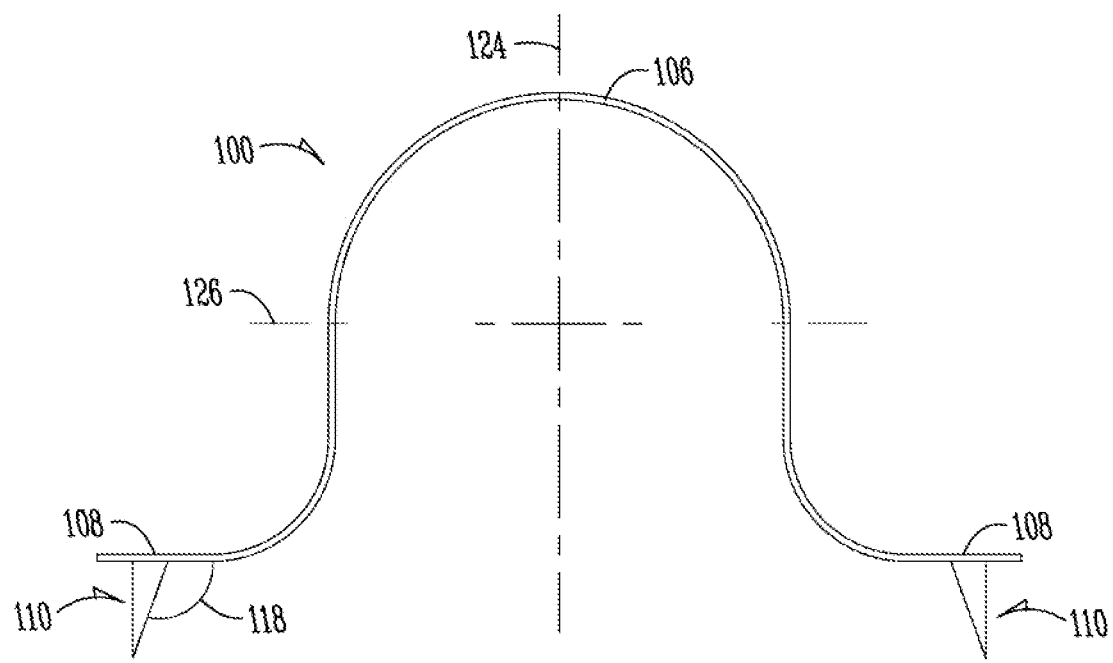
FIG. 2 shows a front elevational view of the fastener of FIG. 1.
Figure 3:
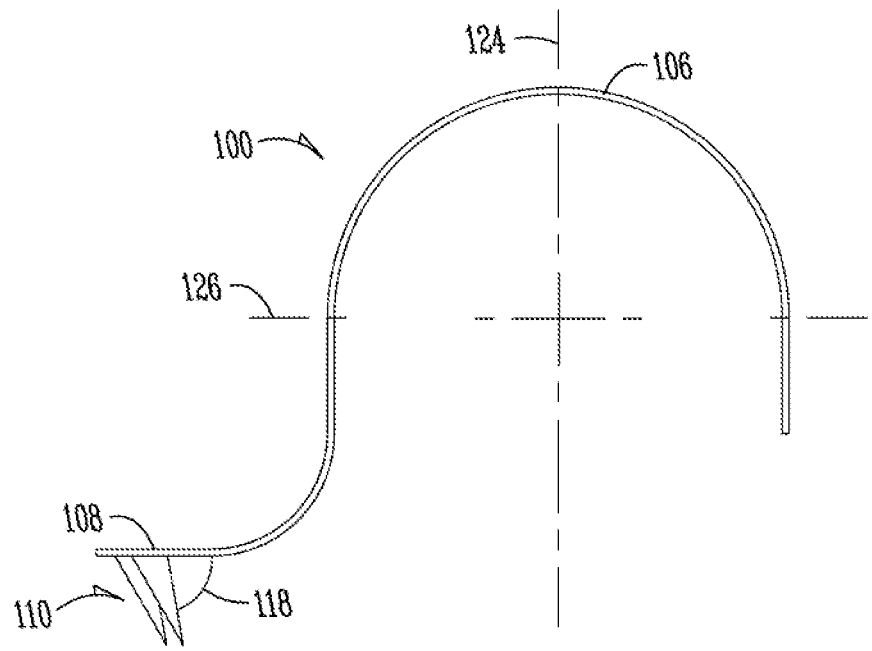
FIG. 3 shows a front elevational view of an alternative fastener.
Figure 4:
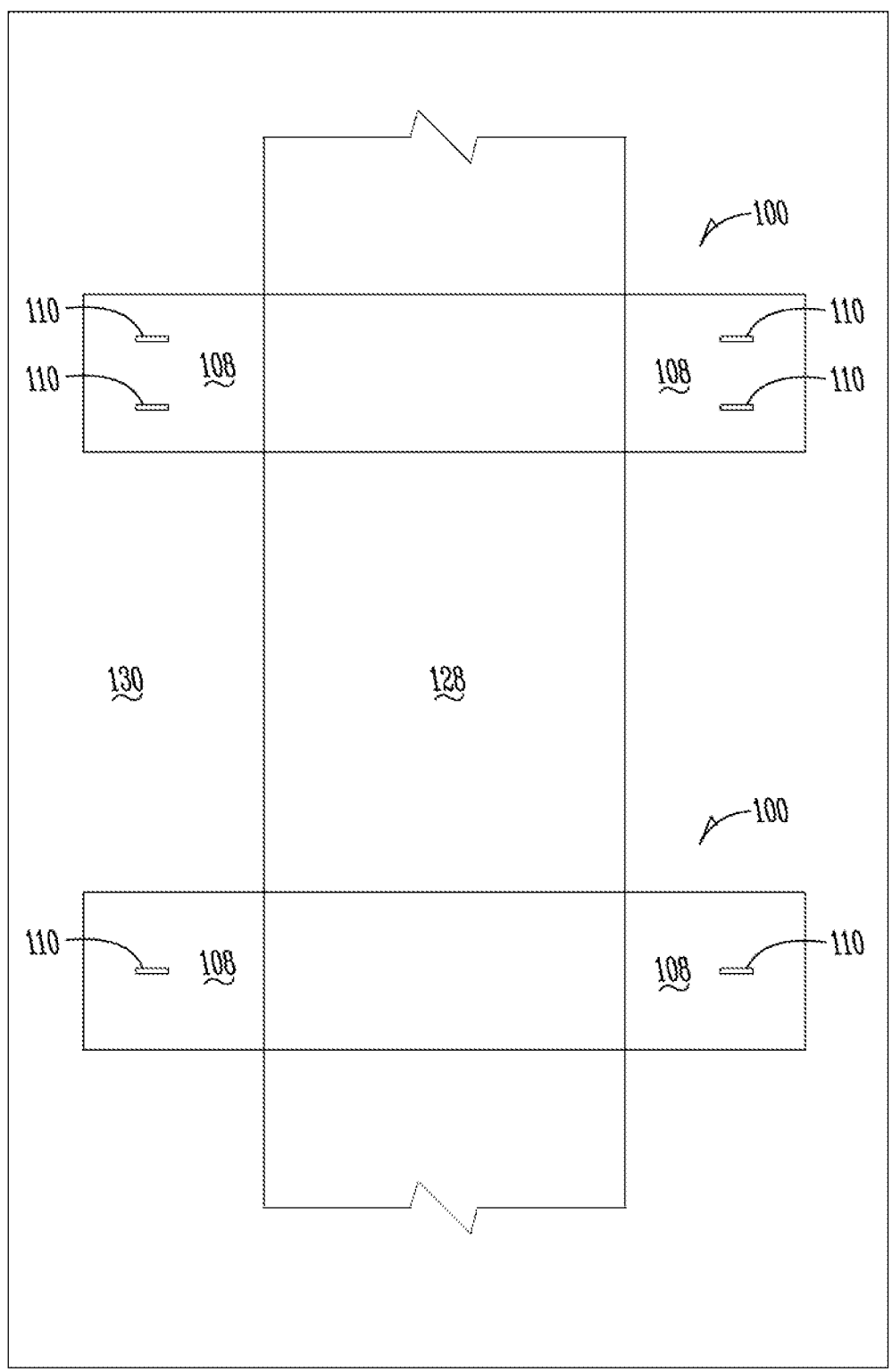
FIG. 4 shows a top elevational view of a system utilizing two distinct fasteners to secure a pipe to a support structure.

The plate 108, preferably rigid, allows for placement of a tooth or spike 110 therewithin. The fastener 100 can include any number of plates, such as two plates 108 opposite one another (as can be seen in FIGS. 1-2 or simply one plate 108 (as can be seen in FIG. 3). Where there are two plates 108, the plates may be positioned or otherwise oriented such that the fastener 100 is symmetrical with respect a vertical axis 124. In such an embodiment, and if the fastener body is also symmetrical with respect to a longitudinal axis traversing its length (i.e. symmetric with respect to width), the fastener 100 will be considered symmetric with respect to at least two axes.

The tooth or spike 110 extends towards a downwardly oriented point with respect to the plate 108. There can be one tooth or spike 110 per plate 108, or several. Where there are several teeth or spikes 110, they may be positioned, arrayed, or otherwise oriented symmetrically and/or uniformly within the plate 108. Alternatively, the teeth or spikes 110 can be asymmetrically located to suit a particular application, such as avoiding a nail located within a wood support to which the fastener 100 is to secure, as is exemplified by the embodiment shown in FIG. 3. Offsetting at least one tooth or spike 110 from a longitudinal centerline traversing the fastener body will help stabilize the fastener 100 along the width and with respect to the surface to which the fastener 100 is secured.

Teeth will generally include a flat blade 112, a point 114, and an edge 116. For example, the blade 112 may be triangularly shaped and the edge 116 extending at an acute, normal, or obtuse angle from a plane parallel to the plate 108, depending on the particular application. An edge 116 which is intended to be a leading edge when driven into a support structure, can be narrower and/or sharper than that of the trailing edge.

Spikes will generally include at least a cylindrical body in lieu of the blade 112 and the edge 116, still terminating at the point 114.

The fastener 100 can be formed of any suitable material, including rigid materials, flexible and/or elastic materials, or any combination thereof. Rigid materials will substantially resist deformation from an original position or configuration. Examples of rigid materials include some metals and metallic alloys, steel, plastics, composites, wood, stone, glass, and synthetic materials imitating properties of any of the preceding materials. Elastic materials will tend to return to an original shape and size when forces causing deformation are removed. In some embodiments, elastic materials will employ snap-fit to facilitate securing one object to another. Examples of elastic materials include some metals and metallic alloys, elastomers (including at least natural rubber, nitrile rubber, silicone rubber, urethane rubbers, chloroprene rubber, ethylene vinyl acetate, etc.), and synthetic materials imitating the properties of any of the preceding materials.

In a preferred embodiment, the fastener body, including upper and lower surfaces 102, 104, the plate 108, and the tooth 110 integrally form a single, unitary piece comprising galvanized steel. Such integration can be caused by forming the fastener 100 from stamping one sheet of metal. The use of galvanized (zinc plated) steel ensures sufficient resistance to corrosion, rusting, and/or other reactions. The galvanized steel is also preferably configured and/or treated so as to be both fireproof and shockproof. Other fireproof, shockproof, and/or non-reactive materials may be used for the fastener body, such as copper, aluminum, copper-plated steel, flame retardant thermoplastics, and the like.

In an alternative embodiment, a leather strap or belt will comprise upper and lower surfaces 102, 104, while the plate 108 and tooth 110 are manufactured from galvanized steel. In such an alternative embodiment, the leather strap or belt can be permanently fixed to the plate 108 such that the fastener 100 requires no assembly and can still be sold as one unit. In the aforementioned block-type embodiment, the fastener body can, by way of non-limiting examples, comprise wood, plastic, or a hard foam.

Different configurations of fasteners 100 may be employed separately or together to suit a particular application. As exemplified by the embodiment shown in FIG. 4, several fasteners 100 used to secure a single pipe or conduit 128 to a support structure 130, such as wood or masonry, need not be of the same type. Components of the fastener 100 can be rearranged or otherwise altered to best facilitate fastening. By way of example, the points at which the fastener 100 attaches to a support structure 130 may be altered such that that the fastener 100 is adapted to secure the conduit or pipe 128 to two surfaces normal to one another (e.g. in corners). By way of another example, the fastener 100 disclosed herein can be used in connection with other objects or components which further facilitate securement, such as adhesive substances applied to the fastener 100 or to a surface of the pipe or conduit 128. By way of yet another example, knurling, grooves, and/or other objects which provide a tactile effect can provide grip to a user while installing the fastener 100 in cramped or not easily accessible locations.

Figure 5A:
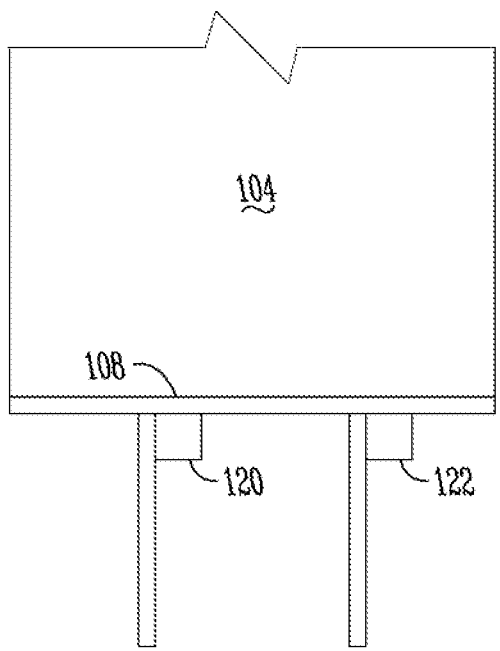
FIGS. 5A, 5B, 5C, and 5D show detailed end views of fasteners emphasizing possible configurations regarding curvature of teeth.
Figure 5B:
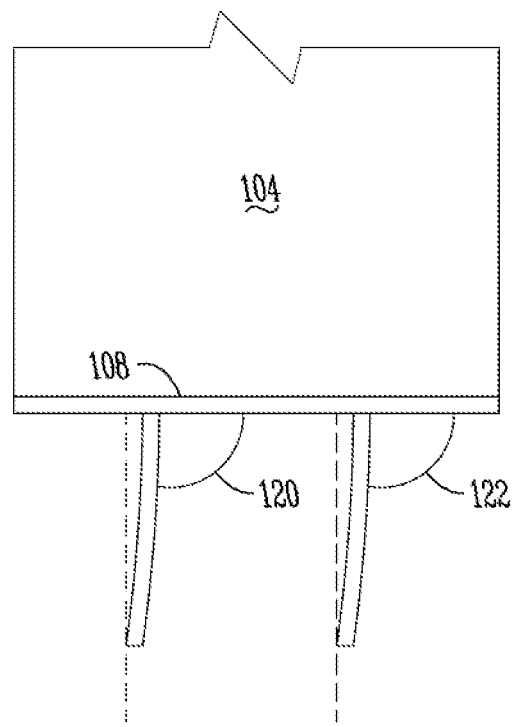
Figure 5C:
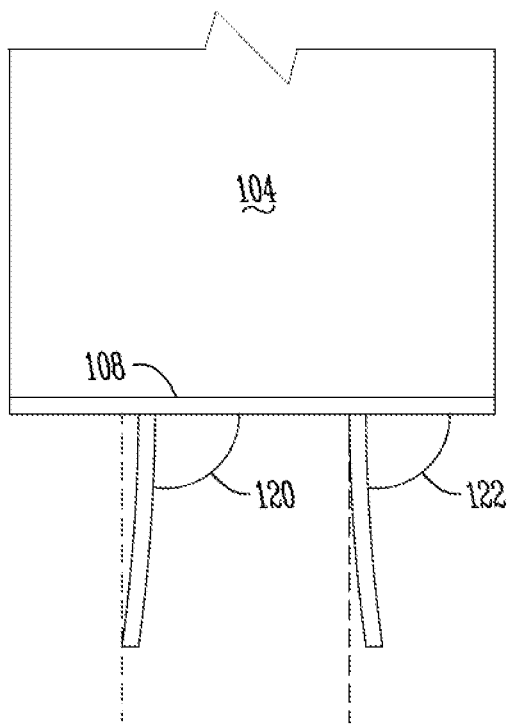
Figure 5D:
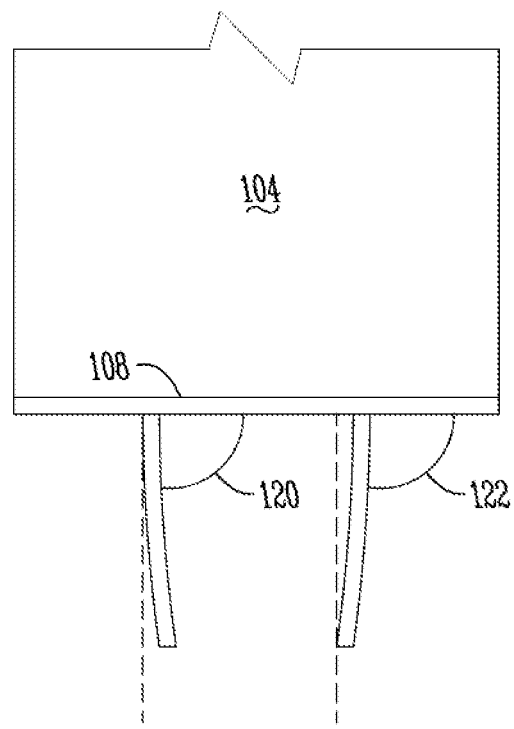
Figure 6:
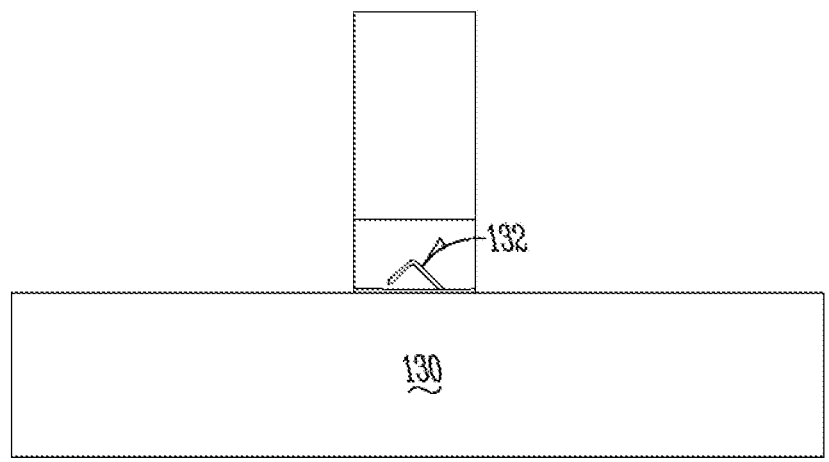
FIG. 6 shows a fastener featuring a malleable spike.

As exemplified by the embodiment shown in FIGS. 5A-5D, the teeth or spikes 110 can be curved at various angles 120, 122 with respect to an axis normal to a plane parallel with the plate 108. By way of example only, both angles 120, 122 can be normal to said plane (FIG. 5A), obtuse or acute to said plane (FIG. 5B), or a mixture of obtuse and acute to said plane (FIG. 5C-5D). Where a mixture of obtuse and acute angles to said plane are utilized, the teeth may flex outward (FIG. 5C) or inward (FIG. 5D). Curving the teeth or spikes 110 can help restrict backward movement of the same once the tooth or spike is driven into the external support. Ratcheting configurations, serrated edges, notches, and/or other mechanisms can also be employed to achieve the same end. For example, the edge 116 of the tooth or spike 110 can (a) be serrated, (b) be barbed, and/or (c) include more than one point 114 along the edge 116 and/or blade 112 to achieve a look similar to a lightning bolt. Alternatively, and depending on the application to which the tooth or spike 110 is needed for fastening, the tooth or spike 110 can take on a shape substantially similar to, or in some instances identical to, a fishhook.

Figure 7:
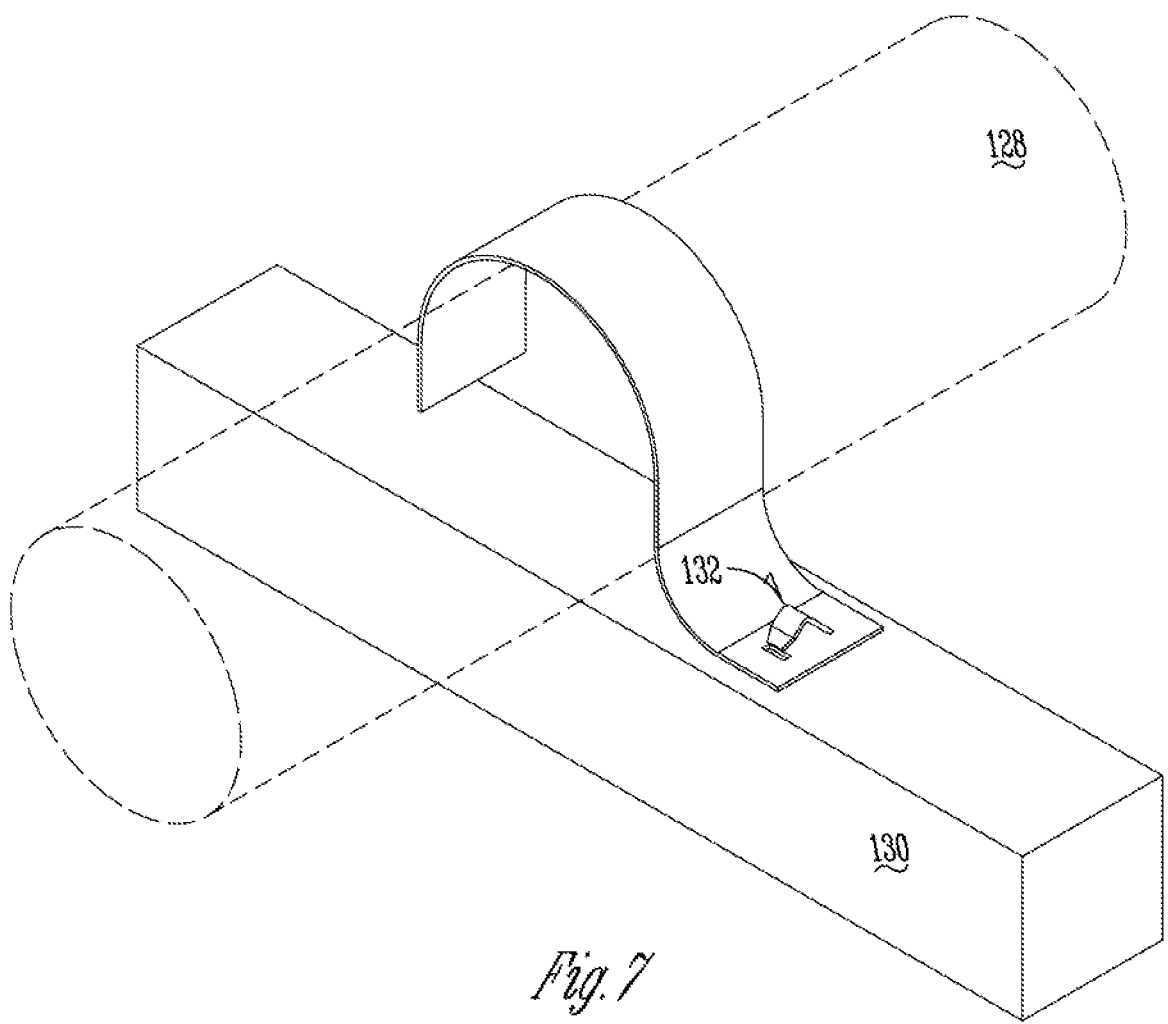
FIG. 7 shows an environmental view of the fastener featuring a malleable spike of FIG. 6.
Figure 8:
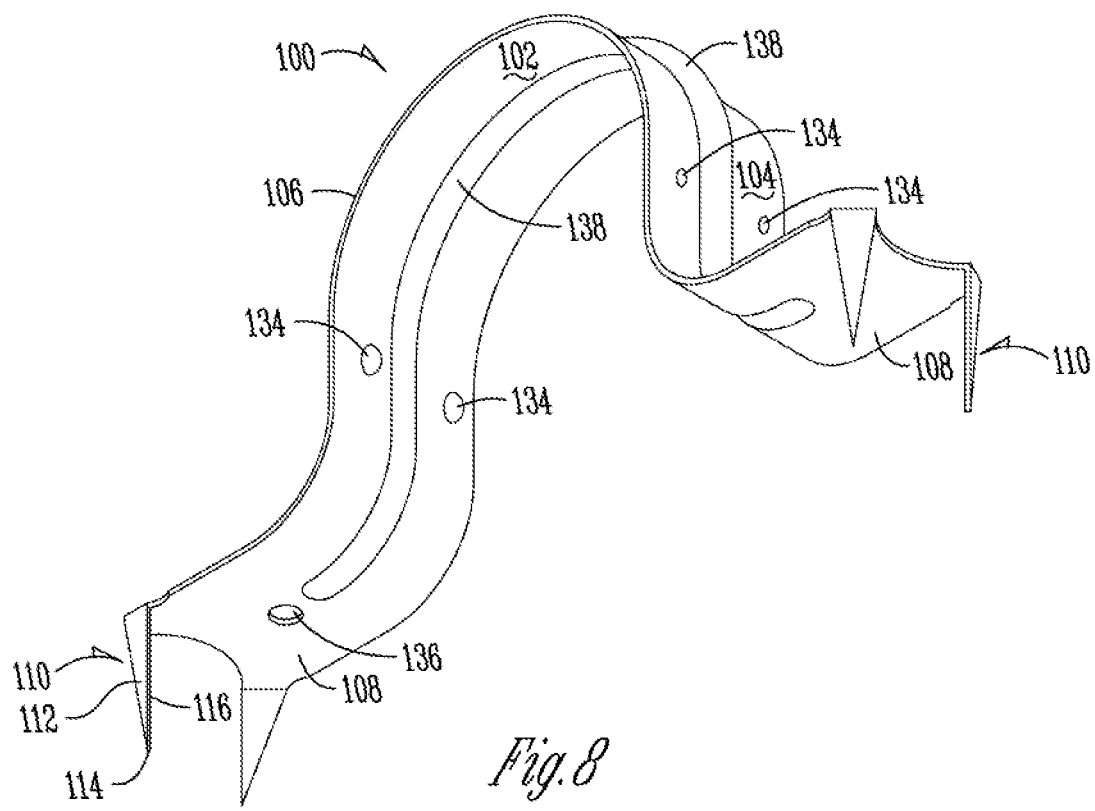
FIG. 8 shows a bottom perspective view of yet another embodiment of a fastener.
Figure 9:
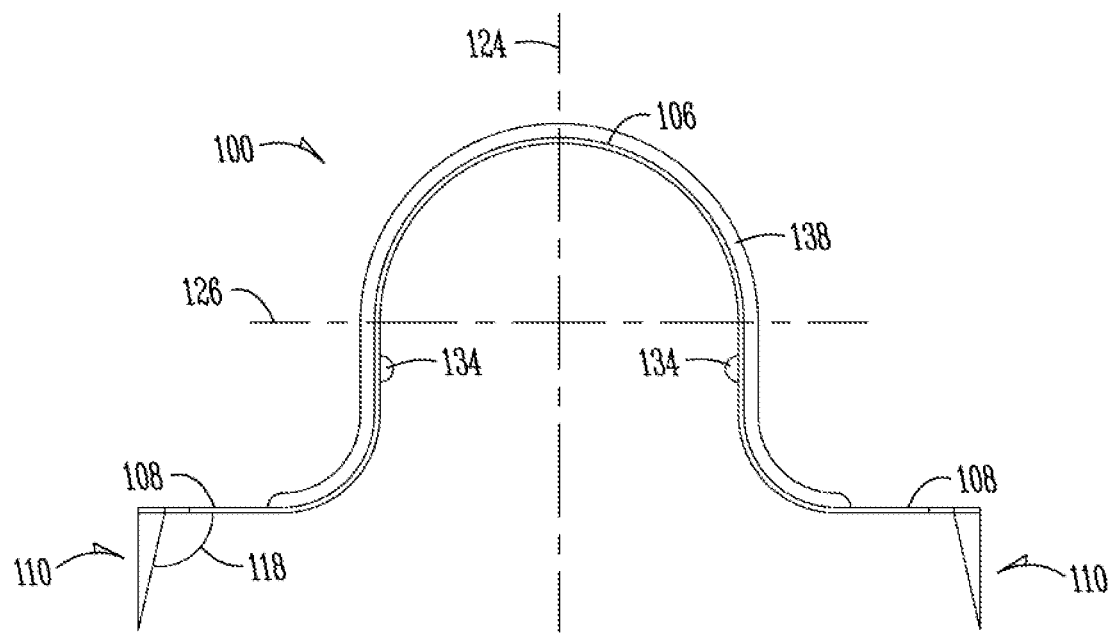
FIG. 9 shows a front elevational view of the fastener of FIG. 8.
Figure 10:
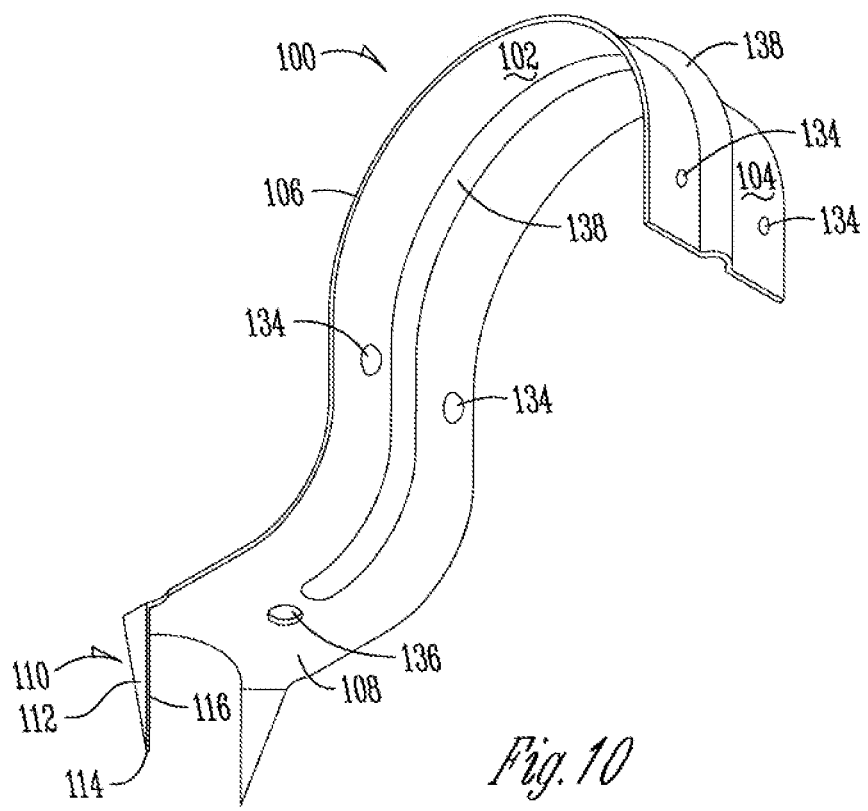
FIG. 10 shows a bottom perspective view of yet another embodiment of a fastener.
Figure 11:
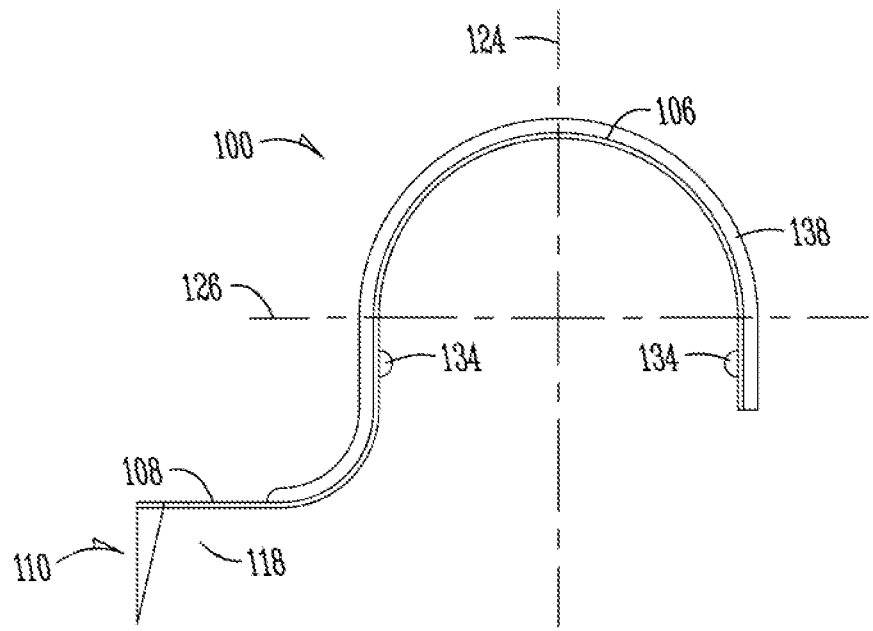
FIG. 11 shows a front elevational view of the fastener of FIG. 10.

In some embodiments, such as the ones shown in FIGS. 1-5, the plate 108 is malleable and force intended to be directly applied. In other embodiments, such as the ones shown in FIGS. 6-7, a malleable tooth or spike 132 can move independently with respect to the plate 108. For example, the malleable tooth or spike 132 can attach to the plate 108 at a hinge, such as a living hinge, so that the malleable tooth or spike 132 can rotatably and/or hingeably move about the same. In FIG. 7, the malleable tooth or spike 132 would thus start in a first position completely above the plate 108 and, after being driven into the support structure 130, would be in a second position level to or below the plate 108.

The fasteners 100 described herein can be configured so as to accommodate support structures 130 that are not flat. For example, the rigid plate(s) 108 can be curved and/or angled so as to substantially match convexly curved surfaces. In other words, the fastener 100 can be used to fasten pipes and/or wiring to structures such as support poles with circular cross-sections.

In operation, a surface of the fastener 100 contacts a surface of the conduit or pipe 128 and, perhaps subsequently, the tooth or spike 110 is driven into the support structure 130 near the conduit or pipe 128 with a threshold force. The threshold force is of sufficient magnitude to allow the tooth or spike 110 to penetrate a surface of the support structure 130. The threshold force, for example, can be applied with a blunt object, such as a hammer, and thus, a nail or screw need not be used to install the fastener 100.

To improve durability of continued securement with the fastener 100, the fastener body may be thermally or electrically insulated, for example with electrical tape or coatings applied to the fastener body. Adhesive substances, abrasives, notches, grooves, interlocking configurations, locking devices, and the like can be utilized to prevent movement after securement. To improve lasting contact between the fastener 100 and the pipe or conduit 128 a snap fit may be established therebetween.

As shown in the embodiments of FIGS. 8-11, the protrusion 134, which appears as a bump, can be used to help lock the snap-fit in place once the fastener 100 is allowed to encompass the pipe or conduit 128.

The fastener 100 can also include centrally located holes 136 in the rigid plate(s) 108 to allow for additional fastening means, such as nails, screws, and bolts to aid in securing the fastener 100, and thus the pipe or conduit 128, to the external support structure 130. The present disclosure is not limited to one hole per one rigid plate 108, and one or more holes 136 can be bored out of a singular rigid plate 108.

Nails used can be those with elongated shanks and an enlarged head that terminate at a point. Screws used can be those with any suitable drive type (e.g. slotted, cruciform, external polygon, internal polygon, hexalobular, three-pointed, irregular, etc.) or even no drive type (e.g. where a hexagonal head is used). Screws can include a helical ridge and an enlarged head that terminate at a point. Bolts can be used in lieu of screws or nails and can include a helical ridge and an enlarged head and, like the screws can accommodate any suitable drive type.

Like the teeth and/or spikes 110, nails and screws can be allowed to penetrate the external surface 130 in various orientations, and said orientations can be specifically chosen in order to complement the existing configuration of the teeth and/or spikes 110. Most embodiments shall orient the rigid plate 108 so as to allow the screws and/or nails to achieve a substantially normal orientation (i.e. at a right angle) during securement, as most persons are familiar with use of screws and/or nails in this way. Still, angled portions of the rigid plate 108, and in particular near the hole 136 can be used where there is a need (such as where space for the nail and/or screw to penetrate the support structure 130 at an angle, e.g. in some corners where only a particular orientation is allowed.

A central spine or brace 138 can be provided along the substantial entirety of the length (longitude) fastener body to provide for stiffening and reinforcement without unduly interfering with the snap-fit characteristics of the fastener 100.

Fasteners 100 that employ screws or nails are preferably configured such that the pipe or conduit 128 will not pull free after securement even under loads of at least 50 lbf for a duration of at least five minutes. All fasteners 100 described herein are configured so as not to crack or break even where the fasteners 100 are condition for at least five hours in a chamber at 2 degrees Fahrenheit, and immediately after removal from the conditioning chamber, shall be able to withstand the impact caused by dropping a 3 lb diameter cylindrical steel weight having a flat 1 inch diameter impact surface with no sharp edges a distance of 11 inches. Fasteners 100 employing screws preferably allow for said screws to establish a torque of greater than 35 lbf-in between the fastener 100 and an external surface, such as wood or masonry 130. For fasteners 100 that allow for nails to pass therethrough, said nails preferably hold the fastener 100 to the external surface 130 in an integral manner. All fasteners 100 are preferably configured such that bending or otherwise damaging the fastener 100 shall also not enable the removal of the pipe or conduit 128 without further force.

For non-flexible conduits and tubing, the fastener 100 is designed with a safety factor for its application specific use so as to withstand a pull force of three times the reference load rating.

The fastener 100 comprises a body which is not to be limited to any one type. The fastener body can thus comprise a clamp, bracket, strap, loop, belt, ring, collar, or any other suitable means for holding another object in a stable and reinforced position. The fastener body or aspects thereof can be flexible or adjusted to facilitate securing objects of varying sizes.

Additionally, the fastener body itself is not to be limited to any one size. The fastener body is preferably configured with material properties of sufficient strength for its intended application, regardless of size. The fastener body, once secured, should be able to withstand a pull force of expected pull conditions, given pipe size. Thus, as the following table below shows, the pull force should increase as the diameter arc of the perimeter 106 increases.

In greater particularity, and with reference to the table below, the fastener body is preferably able to withstand a pull force of at least the following values for a duration of five minutes. Changing variables include the inner diameter (which, for standard pipes, is approximately equivalent, in inches, to its corresponding "trade size"), the type of pipe or conduit used, and reference load rating:

TABLE 1

Optimal Pull Configurations

| | | Pull force/load rating | | | | |
|---|---|---|---|---|---|---|
| | | Electrical metallic tubing (EMT) | | Rigid metal conduit (RMC), intermediate metal conduit (IMC) | | Rigid PVC conduit |
| Trade size | Nominal pipe size, outer diameter (in.) | Pull force (lbf) | Reference load rating (lb) | Pull force (lbf) | Reference load rating (lb) | Pull force (lbf) | Reference load rating (lb) |
| ½ | 0.840 | 75 | 25 | 100 | 30 | 150 | 50 |
| ¾ | 1.050 | 100 | 30 | 150 | 50 | 150 | 50 |
| 1 | 1.315 | 125 | 40 | 190 | 60 | 160 | 50 |
| 1¼ | 1.660 | 150 | 50 | 225 | 75 | 175 | 55 |
| 1½ | 1.900 | 250 | 80 | 250 | 80 | 180 | 60 |
| 2 | 2.375 | 300 | 100 | 300 | 100 | 200 | 65 |
| 2½ | 2.875 | 350 | 110 | 375 | 125 | 250 | 80 |
| 3 | 3.500 | 400 | 130 | 500 | 165 | 300 | 100 |
| 3½ | 4.000 | 500 | 160 | 600 | 200 | 375 | 125 |
| 4 | 4.500 | 600 | 200 | 700 | 330 | 450 | 150 |
| 5 | 5.563 | — | — | 1000 | 330 | 600 | 200 |
| 6 | 6.625 | — | — | 1000 | 435 | 900 | 300 | wherein the tolerance for pipe outer diameter is +1/64 (0.0156) inch and −1/32 (0.0312) inch.

In preferred embodiments, the fastener 100 is configured so as not to inadvertently cause blockages in the pipe 128. The fastener 100 will also not negatively impact flow of fluids or electricity passing through said pipe or conduit 128. More particularly, when a pipe is welded or bent the most common method to inspect blockages, misalignment, ovality, and weld bead dimensional conformity is to pass a round ball through the pipe coil or circuit. If the inner pipe dimension is to be measured then the weld bead should be subtracted, if welding is applicable. Typically, the clearance tolerance for the ball must not exceed 0.039 in. Allowable ovality of any pipe is measured on the inside dimension of the pipe, normally 5% to 10% ovality can be accepted.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 2

List of Reference Characters

| | |
|---|---|
| 100 | fastener |
| 102 | lower surface |
| 104 | upper surface |
| 106 | perimeter |
| 108 | plate |
| 110 | tooth |
| 112 | blade |
| 114 | point |
| 116 | edge |
| 118 | tooth angle |
| 120 | first tooth curvature |
| 122 | second tooth curvature |
| 124 | vertical axis |
| 126 | horizontal axis |
| 128 | pipe/conduit |

TABLE 2-continued

List of Reference Characters

| | |
|---|---|
| 130 | support structure (e.g. wood, masonry) |
| 132 | malleable tooth or spike |
| 134 | bump |
| 136 | hole |
| 138 | spine |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

"Nominal Pipe Size" refers to a set of standard sizes for pipes used for high or low pressures and temperatures. Specific pipe is identified by pipe diameter and another non-dimensional number for wall thickness.

"Ovality" refers to a measurement of deviation from circularity of an oval or approximately elliptical shape.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. A household hardware component for securing an object comprising:
    a steel body, said body comprising:
        an upper surface and a lower surface, each surface being coated with zinc such that the body is substantially non-reactive;
        a perimeter comprising an arc; and
        four protrusions on the lower surface that aid in securing the lower surface to an outer surface of the object;
    a first rigid plate attached to one end of the body; and
    a plurality of teeth or spikes fixed to a bottom surface of the rigid plate;
    a second first rigid plate attached to an opposite end of the body and a second tooth or spike extending from a periphery of the second first rigid plate;
    a spine or brace reinforcing the body, said spine or brace longitudinally traversing the body from the first rigid plate to the second rigid plate, wherein two of the four protrusions are located on one side of the spine and the other two protrusions of the four protrusions are located on an opposite side of the spine;
    wherein each tooth or spike of the plurality of teeth or spikes (a) includes a leading edge and a trailing edge which extend from the rigid plate towards a downwardly oriented point and (b) is offset from a longitudinal centerline traversing the body; and
    wherein the leading edge is narrower than the trailing edge.

2. The household hardware component of claim 1 wherein before securement, the arc comprises a diameter smaller than a diameter of the object such that, in order to secure the body to the object:
    (a) the body is temporarily deformed in an outward direction until the body is capable of encompassing an outer surface of the object; and
    (b) the body is allowed to resiliently return in an inward direction until the body contacts said outer surface, thereby establishing a snap-fit therebetween.

3. The household hardware component of claim 1 wherein the household hardware component is symmetrical with respect to at least two axes.

4. The household hardware component of claim 1 wherein the body is shockproof and fireproof.

5. The household hardware component of claim 1 wherein the plurality of teeth or spikes are placed at a non-zero angle from that which is normal to the first rigid plate.

6. The household hardware component of claim 1 wherein blades of the plurality of teeth or spikes are triangularly shaped and comprised the leading edge and the trailing edge.

7. The household hardware component of claim 1 wherein the plurality of teeth or spikes are ratcheted.

8. The household hardware component of claim 1 wherein the body, the first rigid plate, and the plurality of teeth or spikes form one integral piece.

9. The household hardware component of claim 1 further comprising a hole in the first rigid plate and the second rigid plate through which a nail or screw can be fastened.

10. The household hardware component of claim 1 wherein the household hardware component is adapted to withstand a pull force of 50 lbf for a duration of at least five minutes.

11. The household hardware component of claim 1 wherein the household hardware component is configured so as not to crack or break after:
    (i) being conditioned for at least five hours in a chamber at 2 degrees Fahrenheit; and
    (ii) subsequently, upon being removed from the conditioning chamber after the conditions set forth in (i), can withstand an impact caused by dropping a 3 lb diameter cylindrical steel weight having a flat 1 inch diameter impact surface with no sharp edges a distance of 11 inches.

12. A system comprising a pipe or conduit and wood or masonry, wherein the household hardware component of claim 1 secures the pipe or conduit to the wood or masonry.

13. The system of claim 12 wherein securement is facilitated by use of screws configured to establish a torque of greater than 35 lbf-in between the household hardware component and the wood or masonry.

14. The system of claim 12 wherein securement is facilitated by use of nails which integrate the fastener with the wood or masonry.

* * * * *